Figure 1:
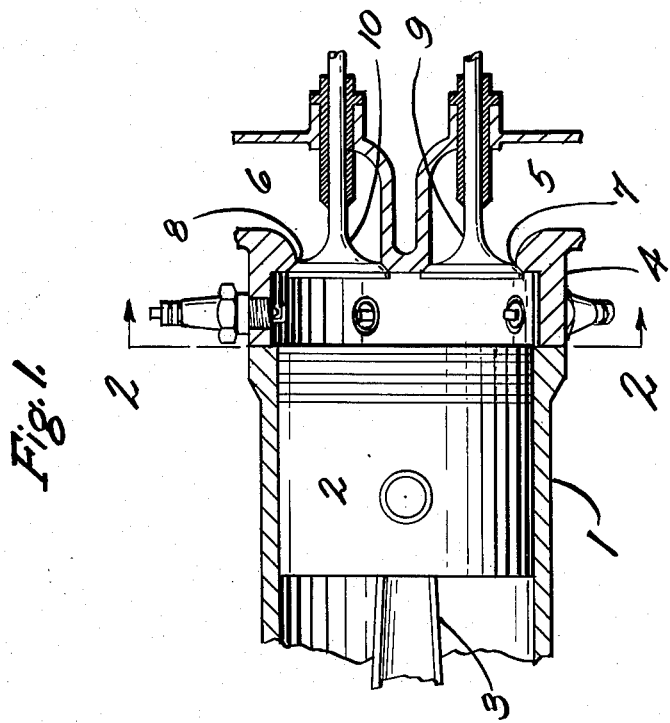

April 4, 1961 W. L. MORRISON 2,977,938
MULTI-SPARK IGNITION ENGINE FOR FIXATION OF NITROGEN
Filed May 6, 1957 2 Sheets-Sheet 1

INVENTOR.
WILLARD L. MORRISON
BY PARKER & CARTER
ATTORNEYS

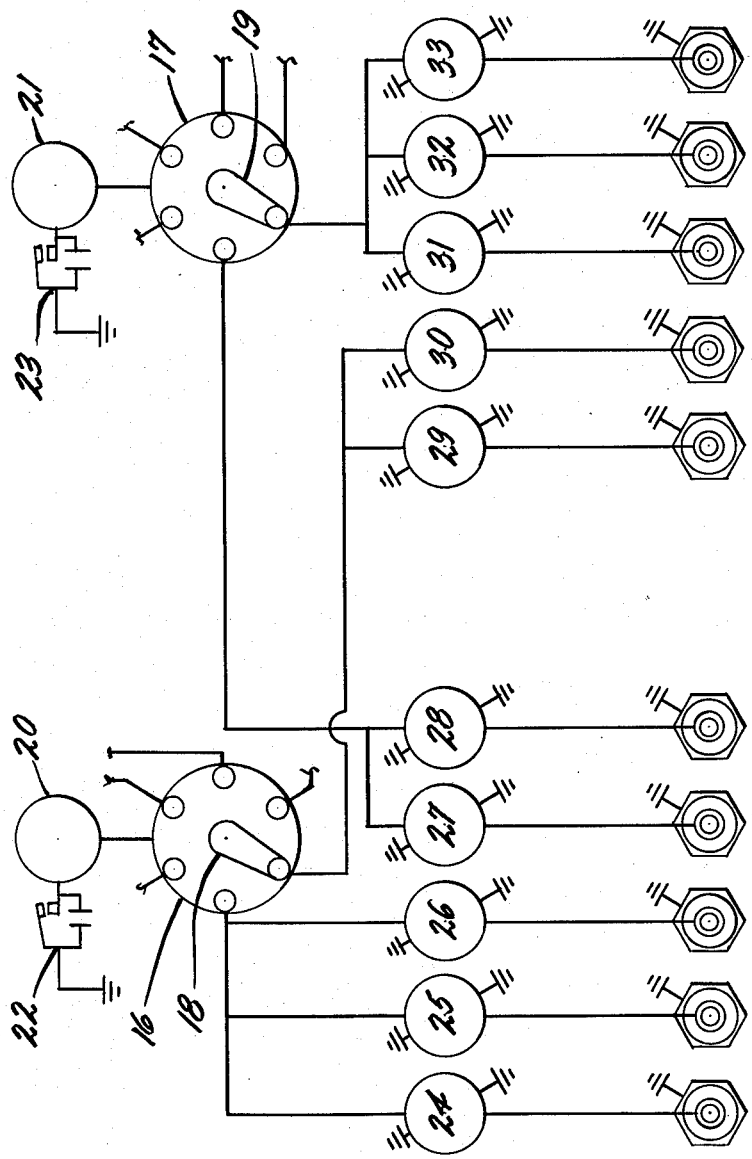

United States Patent Office 2,977,938
Patented Apr. 4, 1961

2,977,938
MULTI-SPARK IGNITION ENGINE FOR FIXATION OF NITROGEN
Willard L. Morrison, Lake Forest, Ill., assignor to The Union Stock Yard and Transit Company of Chicago, Chicago, Ill., a corporation of Illinois
Filed May 6, 1957, Ser. No. 657,248
2 Claims. (Cl. 123—1)

My invention relates to improvements in internal combustion engines and has for one object to provide a type of internal combustion engine which is especially well adapted to the production of an exhaust gas which is exceptionally high in soluble nitrogen compounds.

When a hydrocarbon fuel is burned in an internal combustion engine, the nitrogen in the air drawn in to support combustion of the hydrocarbon usually combines with some of the oxygen to provide an unstable nitrogen-oxygen compound at combustion temperature above 4000° F. During expansion and exhaust, there is a sudden and violent drop in temperature and as a result some of the nitrogen and oxygen remains in combination and may subsequently be found as a soluble nitrogen oxygen compound in the exhaust gas.

This compound is water soluble and highly corrosive and ordinary engine design is directed toward inhibiting or at least reducing the production of water soluble nitrogenous compounds in the exhaust gas.

I propose to use my engine to pump irrigation water in very large quantities and I wish to use that irrigation water as a solvent for water soluble nitrogenous compounds which will directly fertilize the land as they are carried in solution to plant life therein. Therefore, it is important for me to increase rather than decrease the concentration of water soluble nitrogenous compounds.

I have found that if an exceedingly lean mixture of hydrocarbon or other fuel and air is used, more of the oxygen will remain available to combine with the nitrogen and I will get an exhaust having a relatively high concentration of these water soluble nitrogenous compounds. The difficulty with this is that very lean mixtures are exceedingly difficult to ignite and do not satisfactorily support combustion to generate adequate power but I have found that if a multiplicity of spark plugs are used in an engine cylinder of relatively small volumetric capacity and if that multiplicity of spark plugs are distributed about the combustion area, then I will be able to get the effective ignition and effective power generation with the lean mixtures I need for the production of the water soluble nitrogenous compound.

For example, I propose an I-shaped or a cylindrical combustion chamber with the valves opening in opposition to the line of movement of the piston with for example five spark plugs distributed about the periphery of the cylinder of the combustion chamber, each spark plug in a cylinder to fire simultaneously.

This may be applied to a multi-cylinder engine, for example an Otto cycle engine, by the use of two separate magneto distributor breaker systems operating in simultaneous phase in order to distribute the load, one magneto distributor breaker system igniting three of the spark plugs, the other magneto distributor breaker system igniting the other two. This arrangement can be provided for all of the cylinders so that, for example, the first distributor that took care of the three plugs in No. 1 cylinder would take care of two plugs in No. 2 cylinder and the other distributor which fired two plugs in No. 1 cylinder would fire three plugs in No. 2 cylinder and so on but in every case all five plugs fire simultaneous in the cylinder and so a very lean mixture can be burned.

Figure 2:
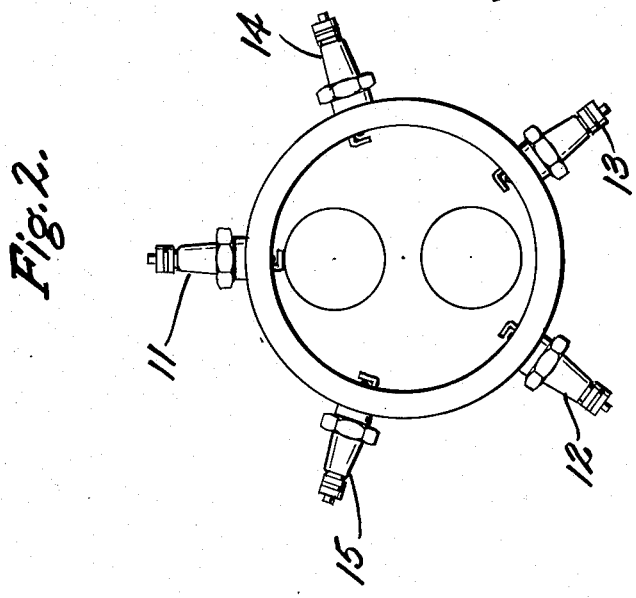

My invention is illustrated more or less diagrammatically in the accompanying drawings, wherein Figure 1 is a vertical section with parts omitted through an internal combustion engine;
Figure 2 is a section along the line 2—2 of Figure 1;
Figure 3 is a wiring diagram.

Like parts are indicated by like characters throughout the specification and drawings.

The cylinder 1 has a piston 2 with connecting rod 3 reciprocating therein. A cylinder head 4 at the upper end of the cylinder contains intake duct 5, exhaust duct 6, intake port 7 and exhaust port 8 controlled respectively by intake valve 9 and exhaust valve 10.

Spark plugs 11, 12, 13, 14 and 15 are distributed about the combustion chamber between the distribution valves 9 and 10 and the piston. I have shown but a single cylinder and that diagrammatically but it will be understood that the engine might well have six separate substantially identical cylinders. Distributors 16 and 17 having distributor arms 18, 19 driven by a single shaft in uniform phase are associated respectively with magnetos 20 and 21 and breakers 22, 23 all coupled together to operate in uniform phase.

I have shown in Figure 3 when distributor arms 18, 19 are at nine o'clock and the breakers 22 and 23 break the circuit, a charge will energize each of the coils 24, 25, 26 to fire plugs 1, 2 and 3 and coils 27 and 28 to fire plugs 4 and 5. Thus one magneto furnishes the charge for three plugs in the left hand cylinder and the other magneto furnishes the charge for the remaining two plugs. If, on the other hand, the distributor arms 18 and 19 are in the position shown in full lines, then coils 29 and 30 will be energized by magneto 20 through distributor 16 and coils 31, 32; 33 being energized by a magneto 21 through distributor 17. A similar arrangement not shown in detail ignites the remaining four cylinders as the distributor arms 18 and 19 complete their excursion.

Since both magnetos, distributors and breakers are in phase, the coils will simultaneously be energized and will simultaneously spark through the five plugs, thus giving the type of ignition necessary to successfully burn the excessively low mixtures I propose to use.

I claim:
1. In the production of an exhaust from a combustion engine having a piston and cylinder assembly, the latter of which is formed with a combustion chamber at one end and wherein the exhaust has a maximum amount of nitrogen oxide gases, the steps of feeding a lean mixture of air and hydrocarbon fuel to the combustion chamber and igniting said lean mixture of air and hydrocarbon simultaneously at a number of spaced apart points to effect rapid combustion of said lean mixture for the corresponding generation of a combustion temperature in excess of 4000° F. whereby reaction between nitrogen and oxygen will occur to produce a relatively high proportion of nitrogen oxides in the exhaust.

2. The method as claimed in claim 1 in which the combustion chamber is provided with a plurality of spark plugs for the purpose of effecting ignition essential to the combustion of the lean mixture of air and hydrocarbon fuel to generate a temperature in excess of 4000° F.

References Cited in the file of this patent

UNITED STATES PATENTS

| | | |
|---|---|---|
| 1,000,732 | Hausser | Aug. 15, 1911 |
| 1,292,241 | Brinton | Jan. 21, 1919 |
| 1,586,508 | Brutzkus | May 25, 1926 |
| 1,856,561 | Keil | May 3, 1932 |
| 2,543,791 | Malin | Mar. 6, 1951 |
| 2,591,687 | Eastman | Apr. 8, 1952 |